(12) United States Patent
Bartol, Jr.

(10) Patent No.: US 8,604,649 B1
(45) Date of Patent: *Dec. 10, 2013

(54) ELECTRIC GENERATOR AND RELATED METHODS

(71) Applicant: Robert J. Bartol, Jr., Boise, ID (US)

(72) Inventor: Robert J. Bartol, Jr., Boise, ID (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/660,901

(22) Filed: Oct. 25, 2012

Related U.S. Application Data (63) Continuation-in-part of application No. 12/856,589, filed on Aug. 14, 2010, now Pat. No. 8,299,659.

(51) Int. Cl.
*H02K 11/00* (2006.01)
*H02K 7/09* (2006.01)

(52) U.S. Cl.
USPC .......... 310/36; 310/68 B; 310/68 D; 310/90.5

(58) Field of Classification Search
CPC ................. H02K 35/00–35/06; F03G 3/06
USPC ............ 310/152, 68 D, 15–39, 90.5; 290/1 R
IPC .............................................. H02K 35/00, 3/06
See application file for complete search history.

(56) References Cited

U.S. PATENT DOCUMENTS

| | | | | |
|---|---|---|---|---|
| 3,011,062 A * | 11/1961 | Goldsmith | ....................... | 290/53 |
| 3,040,225 A * | 6/1962 | Reich | ............................ | 318/132 |
| 4,260,901 A * | 4/1981 | Woodbridge | ................... | 290/42 |
| 5,818,132 A * | 10/1998 | Konotchick | .................... | 310/17 |
| 6,201,329 B1 * | 3/2001 | Chen | ............................ | 310/90.5 |
| 6,798,090 B2 * | 9/2004 | Cheung et al. | .................. | 310/17 |
| 2003/0066830 A1 * | 4/2003 | Reed et al. | ..................... | 219/672 |
| 2006/0250043 A1 * | 11/2006 | Chung | .......................... | 310/216 |
| 2010/0123313 A1 * | 5/2010 | Hobdy | ............................ | 290/42 |
| 2011/0012443 A1 * | 1/2011 | Powers | .......................... | 310/36 |

FOREIGN PATENT DOCUMENTS

| | | | | |
|---|---|---|---|---|
| JP | 61200383 A | * | 9/1986 | ............... F03G 3/06 |
| JP | 2004215472 A | * | 7/2004 | |
| WO | WO 0133700 A1 | * | 5/2001 | |

OTHER PUBLICATIONS

Machine Translation, JP 2004215472 A, Jul. 29, 2004.*
USPTO Translation, JP 61200383 A, Sep. 4, 1986.*

* cited by examiner

*Primary Examiner* — John K Kim
*Assistant Examiner* — Thomas Truong
(74) *Attorney, Agent, or Firm* — Adam R. Stephenson, Ltd.

(57) ABSTRACT

An electric generator. Implementations may have a pendulum extending downwardly from an axle. The pendulum may include a plurality of bar magnets oriented parallel to the axle and being arranged in an arc equidistant and coaxial from the axle. The plurality of bar magnets may be arranged in an alternating pole arrangement. The axle may be mounted between two base units with each base unit including a pickup coil positioned proximate to the arc. The pickup coils may generate an alternating electrical current as the bar magnets pass thereover.

5 Claims, 6 Drawing Sheets

ELECTRIC GENERATOR AND RELATED METHODS

CROSS REFERENCE TO RELATED APPLICATIONS

This application is a continuation-in-part application of the earlier U.S. Utility Patent Application to Robert J. Bartol, Jr. entitled "Electric Power Generator Apparatus," application Ser. No. 12/856,589, filed Aug. 14, 2010, now pending, the disclosure of which is hereby incorporated entirely herein by reference.

BACKGROUND

1. Technical Field

Aspects of this document relate to electric generators.

2. Background Art

Electric generators are devices that convert mechanical energy to electrical energy. Some conventional generators derive mechanical energy from a turbine turned by steam or water.

SUMMARY

Implementations of an electric generator may include: a pendulum extending downwardly from an axle, the pendulum including a plurality of bar magnets oriented parallel to the axle and being arranged in an arc equidistant and coaxial from the axle, the plurality of bar magnets being arranged in an alternating pole arrangement, the axle mounted between two base units, each base unit including a pickup coil positioned proximate to the arc, the pickup coils generating an alternating electrical current as the bar magnets pass thereover.

Implementations of an electric generator may include one, all, or any of the following:

The axle may be mounted to the base units by magnetic bearings at either end thereof.

The magnetic bearing may include a base unit ring magnet mounted on the base unit which surrounds an axle ring magnet mounted on the corresponding axle end, the base unit ring magnet and the axle ring magnet oriented with like poles facing each other thereby preventing physical contact and therefore minimizing friction.

The pendulum may have an arm extending downwardly from the axle and a semicircular base provided on the arm which defines the arc.

The electric generator may further include an electric switch positioned near a path of the pendulum and configured to detect when the pendulum has reached a predetermined point along the path.

The electric generator may further include a time delay module configured to receive an input from the electric switch, wherein a time of the time delay module's receipt of the input defines an input time, and wherein the time delay module is configured to generate an output at a time delayed from the input time by a predetermined amount of time.

Implementations of an electric generator may include: a pendulum extending downwardly from an axle, the pendulum configured to swing in response to a push from a user, the pendulum having a magnet having a north pole and a south pole; an electromagnetic coil having turns wound around, but not touching, the magnet; and a stationary magnet aligned with a path of the magnet, the stationary magnet configured to repel the magnet when the magnet is near the stationary magnet.

Implementations of an electric generator may include one, all, or any of the following:

The electric generator may further include an electric switch positioned near the path of the magnet and configured to detect when the magnet has reached a predetermined point along the path.

The electric generator may further include a time delay module configured to receive an input from the electric switch, wherein a time of the time delay module's receipt of the input defines an input time, and wherein the time delay module is configured to generate an output at a time delayed from the input time by a predetermined amount of time.

The stationary magnet may include an electromagnet configured to be activated when the magnet has reached a predetermined point along the path.

The electric generator may further include a first rectifier and a second rectifier each electrically coupled to the electromagnetic coil by both a first wire and a second wire, the first rectifier and second rectifier configured to convert alternating current induced in the electromagnetic coil into direct current, and a third wire and fourth wire each electrically coupled to the first rectifier and the second rectifier and configured to transmit the direct current to a battery.

The electric generator may further include a battery electrically coupled to the electromagnetic coil and configured to receive an electric charge in response to the pendulum swinging.

The axle may include a plurality of concentric magnetic rings with like poles facing one another.

Implementations of an electric generator may include: a pendulum extending downwardly from an axle, the pendulum configured to swing in response to a push from a user, the pendulum having a magnet having a north pole and a south pole; a stationary electromagnetic coil with turns wound around, but not touching, the magnet, wherein the magnet has a freedom of motion relative to and within the stationary electromagnetic coil along a path of the magnet; a stationary magnet aligned with the path of the magnet, the stationary magnet having an electromagnet configured to be activated to one of repel and attract the magnet when the magnet is near the stationary magnet; an electric switch positioned near the path of the magnet and configured to detect when the magnet has reached a predetermined point along the path; a time delay module configured to receive an input from the electric switch, wherein a time of the time delay module's receipt of the input defines an input time, and wherein the time delay module is configured to generate an output at a time delayed from the input time by a predetermined amount of time; wherein the electric generator is configured to activate the electromagnet in response to the time delay module generating the output.

Implementations of an electric generator may include one, all, or any of the following:

The electric generator may further include a battery electrically coupled to the time delay module and to the electromagnet, the battery configured to activate the electromagnet in response to the time delay module generating the output.

The electric generator may further include a battery switch electrically coupled to the time delay module and to the battery and wherein the battery switch is configured to cause the battery to activate the electromagnet in response to the battery switch receiving the output from the time delay module.

The electromagnet may be positioned such that, when activated, the electromagnet and the magnet have like poles facing one another so as to repel one another.

The electric generator may further include a first rectifier and a second rectifier each electrically coupled to the electromagnetic coil by both a first wire and a second wire, the first rectifier and the second rectifier configured to convert alternating current induced in the electromagnetic coil into direct current, and a third wire and fourth wire each electrically coupled to the first rectifier and second rectifier and configured to transmit the direct current to a battery.

The axle may include a plurality of concentric magnetic rings with like poles facing one another.

The foregoing and other aspects, features, and advantages will be apparent to those artisans of ordinary skill in the art from the DESCRIPTION and DRAWINGS, and from the CLAIMS.

BRIEF DESCRIPTION OF THE DRAWINGS

Implementations will hereinafter be described in conjunction with the appended drawings, where like designations denote like elements, and.

DESCRIPTION

This disclosure, its aspects and implementations, are not limited to the specific components, assembly procedures or method elements disclosed herein. Many additional components, assembly procedures and/or method elements known in the art consistent with the intended electric generator will become apparent for use with particular implementations from this disclosure. Accordingly, for example, although particular implementations are disclosed, such implementations and implementing components may comprise any shape, size, style, type, model, version, measurement, concentration, material, quantity, method element, step, and/or the like as is known in the art for such electric generators, and implementing components and methods, consistent with the intended operation and methods.

Figure 1:
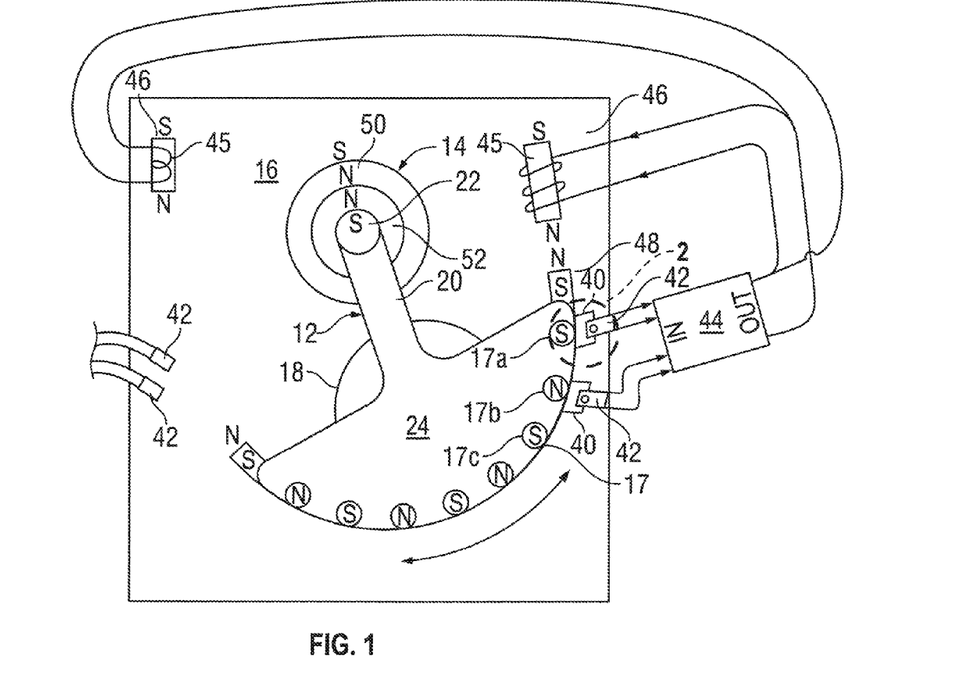
FIG. 1 is a front view of an implementation of an electric generator with one pickup coil removed for purposes of explanation.
Figure 2:
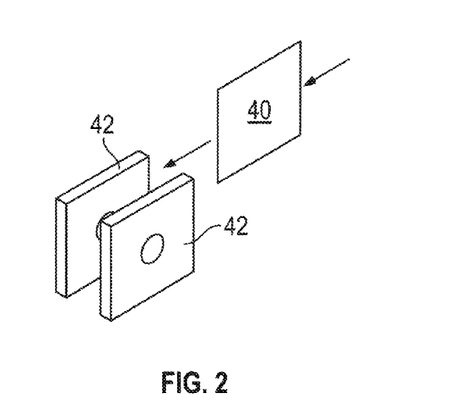
FIG. 2 is a close up of circled area 2 in FIG. 1.

Referring now to FIG. 1, in implementations an electric generator 10 includes a pendulum 12 extending downwardly from an axle 22. Axle 22, in turn, is mounted at both ends thereof to two base units 16 by magnetic bearings 14. In implementations each magnetic bearing 14 uses a base unit ring magnet 50 which surrounds an axle ring magnet 52 which are oriented with like poles facing each other to prevent contact and hence minimize friction. Each pendulum also includes a plurality of bar magnets 17 arranged to alternate poles as discussed in more detail below. The base units 16 each include a pickup coil 18.

Figure 3:
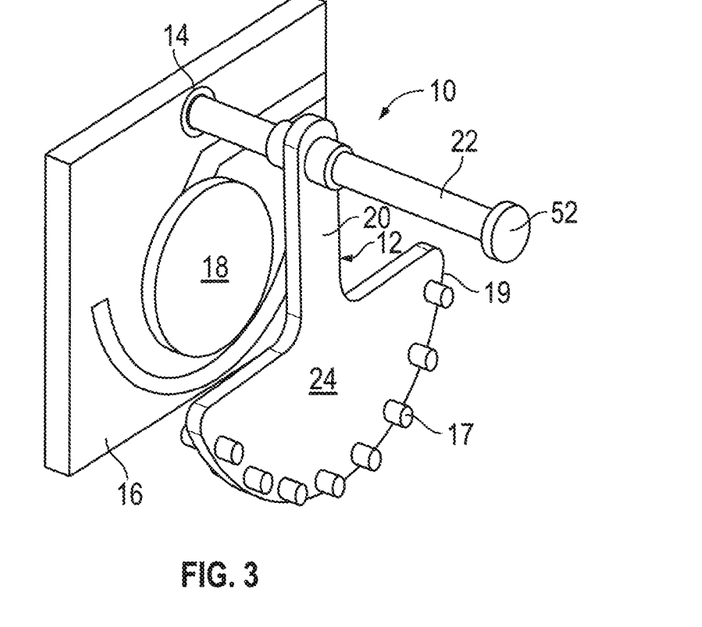
FIG. 3 is a side and top perspective view of in implementation of an electric generator.
Figure 4:
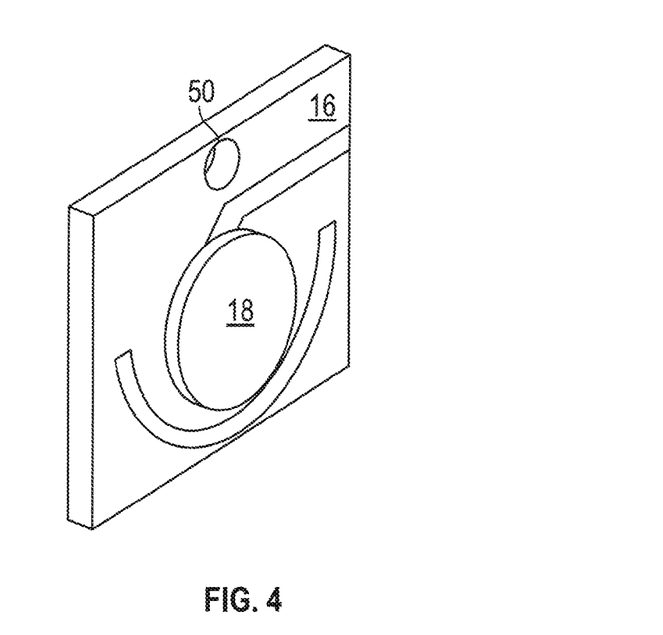
FIG. 4 is a side and top perspective view of an implementation of a base unit of an electric generator.
Figure 5:
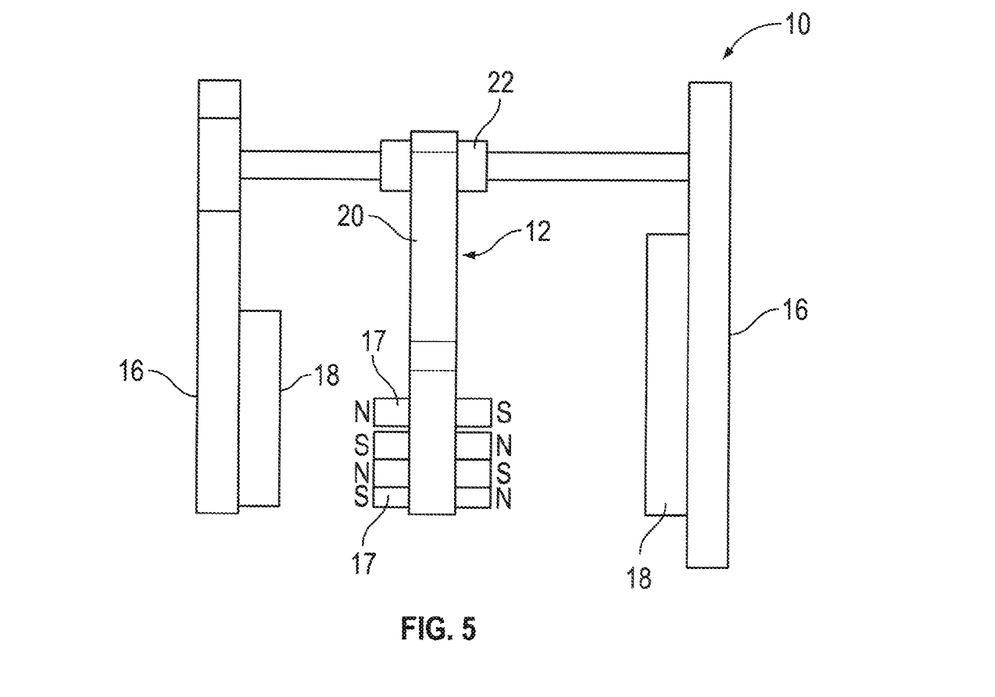
FIG. 5 is a side view of an implementation of an electric generator in a first position.

As best seen in FIGS. 1, 3 and 5, in implementations pendulum 12 includes an arm 20 extending downwardly from an axle 22. The plurality of bar magnets 17 are mounted on arm 20 and arranged in an arc 19 parallel, equidistant and coaxial from axle 22. For purposes of illustration, a semicircular base 24 is provided on arm 20 to provide the arc 19 but those skilled in the art will recognize that there are many methods and designs which can position bar magnets 17 equidistant from axle 22. For example, each bar magnet 17 could be mounted on a radial arm of equal lengths extending downward from axle 22.

Figure 6:
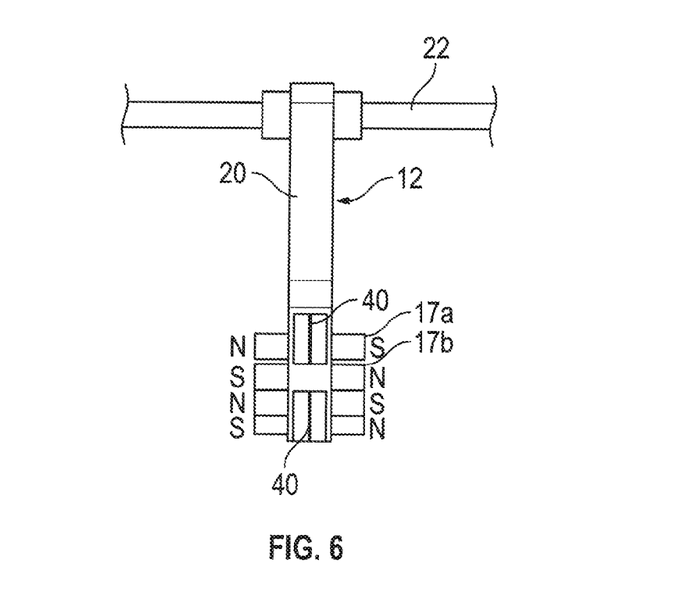
FIG. 6 is a partial side view of an implementation of an electric generator in a second position.

In implementations the bar magnets 17 are arranged in alternating alignment as best seen in FIG. 1. The end of first bar magnet 17a at the right side has a south pole S, the end of the second bar magnet 17b has a north pole N, the end of the third bar magnet 17 has south pole S and so on. As shown in FIGS. 5 and 6, of course the ends of the bar magnets 17 on the other side of pendulum 12 will also alternate but in opposite fashion than the side visible in FIG. 1.

As pendulum 12 swings, bar magnets 17 pass near pickup coils 18 on base units 16. As each bar magnet 17 passes, pickup coils 18 will generate an alternating electric current. This current can be captured to charge batteries and/or power electrical appliances and the like.

To control, a pair of optical plates 40 extend outwardly from arc 19 at one end thereof. Optical plates 40 are positioned to pass between light detecting devices 42 which are mounted to base units 16 as pendulum 12 swings. Light detecting devices 42 are in electrical communication with variable time delay circuit 44. Variable time delay circuit 44 is, in turn, in electrical communication with booster coil 45 which is wound around a stationary magnet 46. Stationary magnet 46 is mounted on base unit 16 just beyond but proximate to the extent of the swing of arc 19.

Mounted at either end of arc 19 are second bar magnets 48. Second bar magnets 48 and stationary magnets 46 are oriented whereby like poles, either NN or SS, are facing one another. This provides a limit as to how far pendulum 12 can swing since the like poles will repel each other. This repelling movement is reinforced when variable time delay circuit 44 sends a current pulse into booster coil 45 in response to signals received from light detecting devices 42. The current pulse increases the magnetic repelling force of stationary magnet 46 against second bar magnet 48. During operation, as pendulum 12 reaches its limit, and starts its downswing, the current pulse to the coil around magnet 46 is applied during the downswing and is adjusted by the variable time delay to obtain maximum downward thrust, which is aided by the Earth's gravitational pull on pendulum 12. In particular embodiments, power for the current pulse is provided from pickup coils 18.

Figure 7:
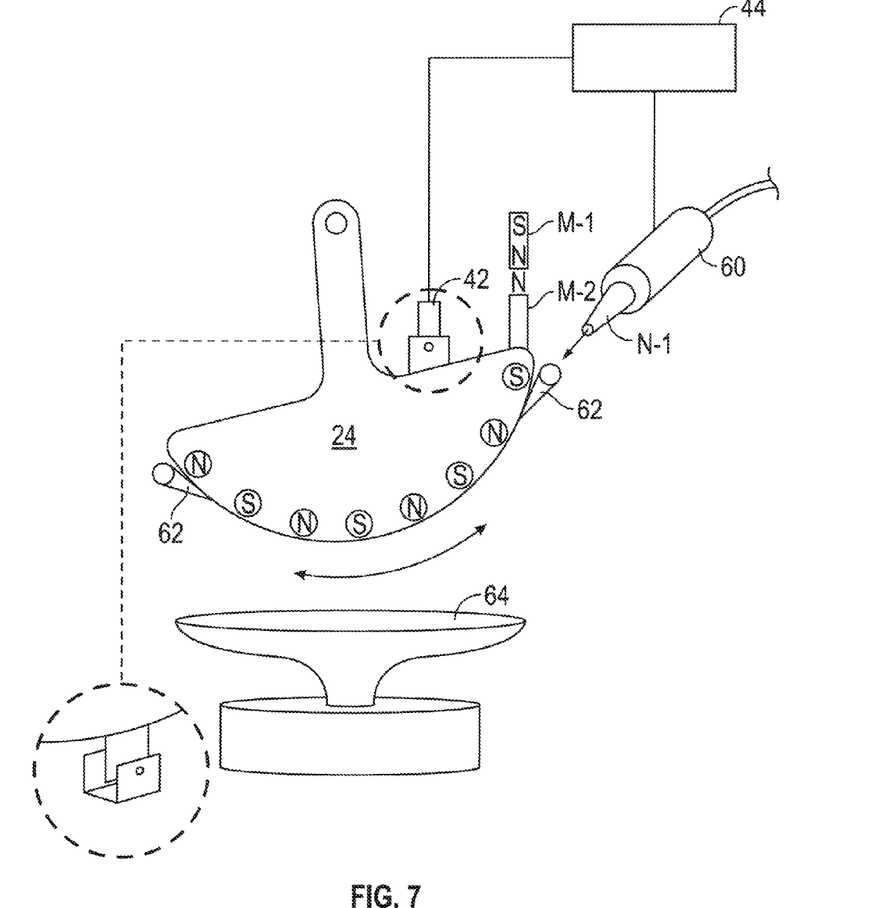
FIG. 7 is a side view of an implementation of an electric generator.
Figure 8:
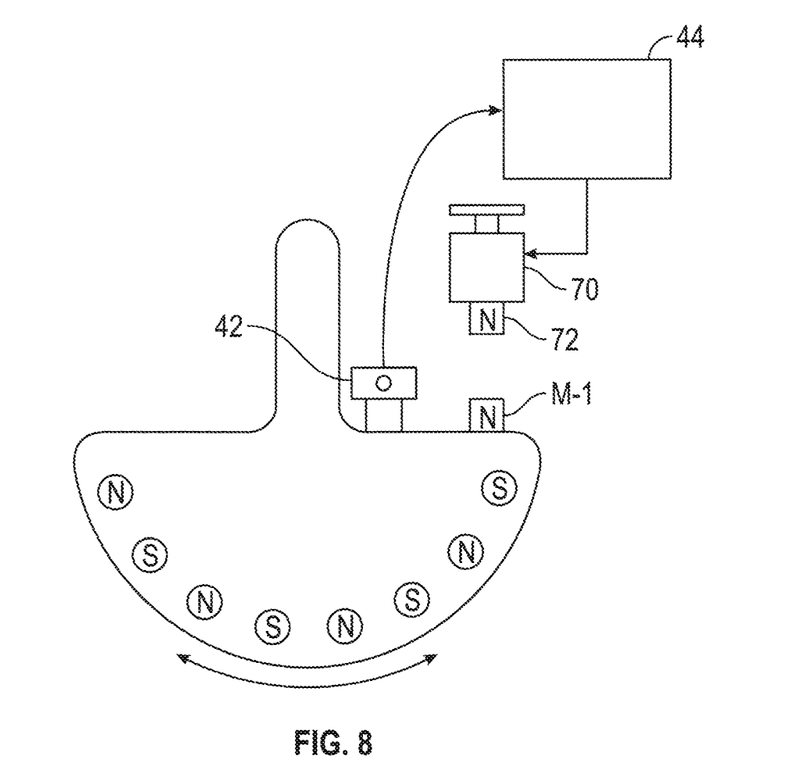
FIG. 8 is a side view of an implementation of an electric generator.

In alternate embodiments illustrated in FIGS. 7 and 8, force from various components is applied during the downswing to increase the downward force, which is aided by the Earth's gravitational pull. Accordingly, in the alternate embodiment depicted in FIG. 7, variable time delay circuit 44 sends its current pulse into a solenoid 60 which squirts either water or compressed air into a cone 62 mounted on the pendulum 12. If water is used, a water collector 64 catches the water and recirculates to solenoid 60. Water can be obtained from either a home supply or a business. The water or air from solenoid 60 repels pendulum 12 and provides impetus for a swing in the opposite direction. Also in this alternate embodiment, light detecting devices 42 are mounted atop semicircular base 24.

In an alternate embodiment depicted in FIG. 8, a solenoid 70 is in electrical communication with variable time delay circuit 44. Solenoid 70, when actuated, extends a solenoid magnet 72 towards pendulum 12. A pendulum magnet M-1 is mounted atop the semicircular base. When solenoid magnet 72 is actuated, one pole thereof is positioned proximate to the like pole of pendulum magnet M-1 when pendulum 12 reaches the end of its swing arc. In the illustrated embodiment, the like poles are north poles. However, south poles will function in exactly the same manner. The like poles of pendulum magnet M-1 and solenoid magnet 72 will repel each other thereby providing impetus to pendulum 12. Also in this embodiment, light detecting devices 42 may be included and utilized as described in other embodiments disclosed herein.

Figure 9:
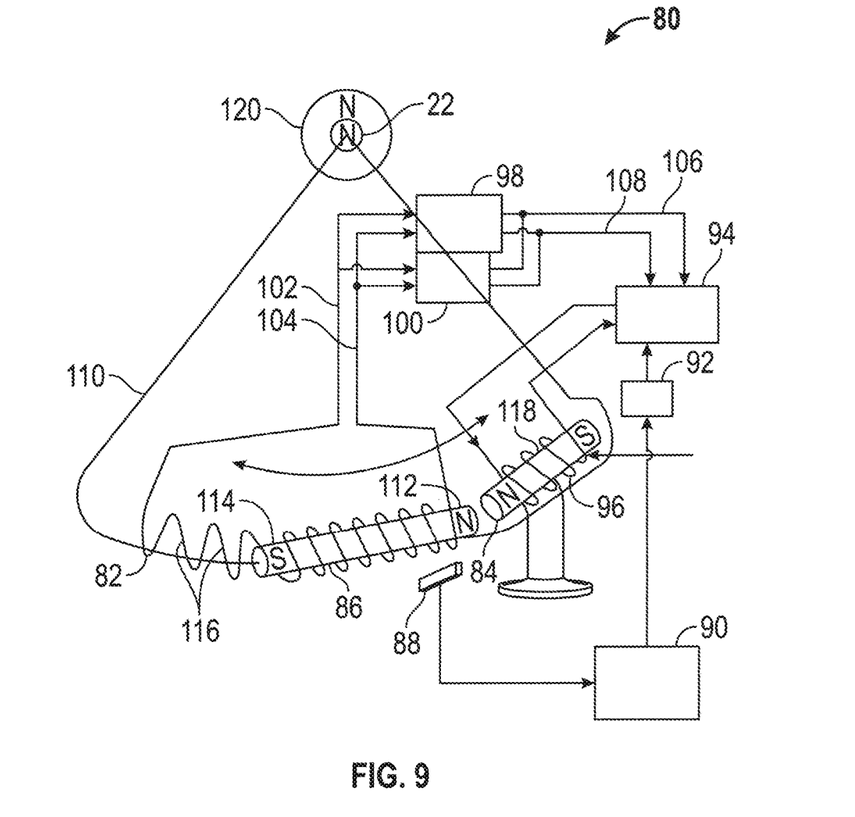
FIG. 9 is a partial side view of an implementation of an electric generator.

Referring now to FIG. 9, in implementations an electric generator 80 includes an electromagnetic coil 82 having several to a plurality of turns 116. A magnet 86, having a north pole 112 and a south pole 114 (which in various implementations may be reversed) is positioned so as to have a freedom of motion within the electromagnetic coil 82 along a path. In implementations the path is determined, as can be imagined, by the motion of a pendulum 110 including the magnet 86, where the motion of the pendulum is facilitated by an axle 22. The pendulum 110 is coupled to a base unit of the electric generator 80 by the axle 22.

In implementations a stationary magnet 84 is positioned along the path of the magnet 86. In implementations the stationary magnet 84 includes an electromagnet 118 and the electromagnet 118 includes an electromagnetic coil 96. The stationary magnet 84 in implementations is configured to either repel or attract the magnet 86 when the magnet 86 is near the stationary magnet 84. This repulsion or attraction may be utilized, for example, to at least partially maintain a swinging motion of the pendulum 110 imparted to the pendulum 110 by an initial push from a user. In implementations the electromagnet 118 may be powered by a battery 94.

In implementations an electric switch 88 may be positioned to be near the path of the magnet 86 and may be configured to send an input to a time delay module 90 when the magnet 86 has reached a predetermined position along the path. For example, in implementations the electric switch 88 may be coupled to other components which may be configured to properly time the activation of the electromagnet 118 so as to at least partially maintain a swinging motion of the pendulum 110 imparted to the pendulum 110 by a push of a user. Still referring to FIG. 9, in implementations the time delay module 90 may receive the input from the electric switch 88 at a time defined as the input time, and the time delay module 90 may be configured to generate, at a specified time after the input time, an output. The output in implementations may directly activate the electromagnet 118 or, in other implementations, the output may be received by a battery switch 92 coupled to a battery 94 and the battery switch 92, in response to receipt of the output, may cause the battery 94 to activate the electromagnet 118.

In implementations the electric switch 88 may be, by non-limiting example, a Reed switch.

In implementations the electric generator 80 includes a first rectifier 98 and a second rectifier 100. A first wire 102 couples the electromagnetic coil 82 both to the first rectifier 98 and the second rectifier 100. A second wire 104 couples the electromagnetic coil 82 both to the first rectifier 98 and second rectifier 100. A third wire 106 couples both the first rectifier 98 and second rectifier 100 to a battery 94. A fourth wire 108 couples both the first rectifier 98 and second rectifier 100 to a battery 94. The first rectifier 98 and second rectifier 100 are configured to convert an alternating current induced in the electromagnetic coil 82 into a direct current and transport the electric current to the battery 94 to impart a charge to the battery 94. Thus, in various implementations, some of the electrical energy produced by conversion from the mechanical energy imparted to the pendulum 110 may be re-converted to mechanical energy through use of the battery 94 and the stationary magnet 84 to at least partially maintain a swinging motion of the pendulum 110 imparted to the pendulum 110 by a user. In such implementations such swinging motion may degrade over time without the addition of further outside mechanical energy imparted by a user or other source.

In other implementations, an electric generator 10 may include an electric switch 88 positioned near a path of the pendulum 12 and configured to detect when the pendulum 12 has reached a predetermined point along the path. In implementations an electric generator 10 may include a time delay module 90 configured to receive an input from an electric switch 88, wherein a time of the time delay module's 90 receipt of the input defines an input time, and wherein the time delay module 90 is configured to generate an output at a time delayed from the input time by a predetermined amount of time. The electric generator 10 may thus have a system for at least partially maintaining a swinging motion of the pendulum 110 as described above with respect to electric generator 80 including a battery 94, an electromagnet 118, and so forth.

Figure 9A:
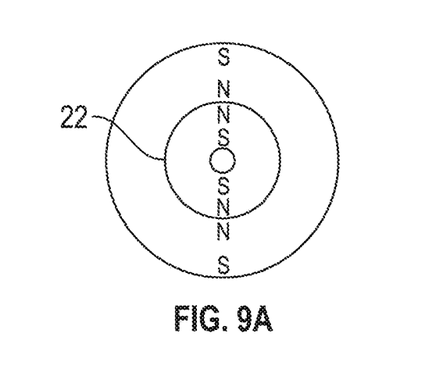
FIG. 9A is a side view of an implementation of an axle of an electric generator.

In implementations an electric generator 80 includes a pendulum 110 extending downwardly from an axle 22, the pendulum 110 configured to swing in response to a push from a user, the pendulum including a magnet 86 having a north pole 112 and a south pole 114, the electric generator 80 further including an electromagnetic coil 82 having turns 116 wound around, but not touching the magnet 86. A stationary magnet 84 is aligned with a path of the magnet 86, the stationary magnet 84 configured to repel the magnet 86 when the magnet 86 is near the stationary magnet 84. In implementations the electric generator 80 further includes an electric switch 88 positioned near the path of the magnet 86 and configured to detect when the magnet 86 has reached a predetermined point along the path. In implementations the electric generator 80 further includes a time delay module 90 configured to receive an input from the electric switch 88, wherein a time of the time delay module's 90 receipt of the input defines an input time, and wherein the time delay module 90 is configured to generate an output at a time delayed from the input time by a predetermined amount of time. In implementations the stationary magnet 84 includes an electromagnet 118 configured to be activated when the magnet 86 has reached a predetermined point along the path. In implementations the electric generator 80 further includes a first rectifier 98 and a second rectifier 100 each electrically coupled to the electromagnetic coil 82 by both a first wire 102 and a second wire 104, the first rectifier 98 and second rectifier 100 configured to convert alternating current induced in the electromagnetic coil 82 into direct current, and a third wire 106 and fourth wire 108 each electrically coupled to the first rectifier 98 and the second rectifier 100 and configured to transmit the direct current to a battery 94. In implementations the electric generator 80 further includes a battery 94 electrically coupled to the electromagnetic coil 82 and configured to receive an electric charge in response to the pendulum 110 swinging. For example the electric charge may be used to recharge the rechargeable battery 94. In implementations the axle 22 includes a plurality of concentric magnetic rings 120 with like poles facing one another (for example north poles N facing one another and/or south poles S facing one another).

In various implementations an electric generator 80 includes a pendulum 110 extending downwardly from an axle 22, the pendulum 110 configured to swing in response to a push from a user, the pendulum 110 having a magnet 86 having a north pole 112 and a south pole 114; a stationary electromagnetic coil 82 with turns 116 wound around, but not touching, the magnet 86, wherein the magnet 86 has a freedom of motion relative to and within the stationary electromagnetic coil 82 along a path of the magnet 86; a stationary magnet 84 aligned with the path of the magnet 86, the stationary magnet 84 having an electromagnet 118 configured to be activated to one of repel and attract the magnet 86 when the magnet 86 is near the stationary magnet 84; an electric switch 88 positioned near the path of the magnet 86 and configured to detect when the magnet 86 has reached a predetermined point along the path and generate an input in response to the magnet 86 reaching the predetermined point along the path; a time delay module 90 configured to receive the input from the electric switch 88, wherein a time of the time delay module's 90 receipt of the input defines an input time, and wherein the time delay module 90 is configured to generate an output at a time delayed from the input time by a predetermined amount of time; wherein the electric generator 80 is configured to activate the electromagnet 118 in response to the time delay module 90 generating the output.

In various implementations the electric generator 80 further includes a battery 94 electrically coupled to the time delay module 90 and to the electromagnet 118, the battery 94 configured to activate the electromagnet 118 in response to the time delay module 90 generating the output. In particular implementations the electric generator 80 further includes a battery switch 92 electrically coupled to the time delay module 90 and to the battery 94 and the battery switch 92 is configured to cause the battery 94 to activate the electromagnet 118 in response to the battery switch 92 receiving the output from the time delay module 90. In implementations the electromagnet 118 is positioned such that, when activated, the electromagnet 118 and the magnet 86 have like poles facing one another so as to repel one another. In implementations the electromagnet 118 may be positioned such that, when activated, the electromagnet 118 and the magnet 86 have opposite poles facing one another so as to attract one another.

In various implementations the electric generator 80 further includes a first rectifier 98 and a second rectifier 100 each electrically coupled to the electromagnetic coil 82 by both a first wire 102 and a second wire 104, the first rectifier 98 and the second rectifier 100 configured to convert alternating current induced in the electromagnetic coil 82 into direct current, and a third wire 106 and fourth wire 108 each electrically coupled to the first rectifier 98 and second rectifier 100 and configured to transmit the direct current to a battery 94. In implementations the axle 22 includes a plurality of concentric magnetic rings 120 with like poles facing one another.

In implementations the electric generator 10, 80 converts mechanical energy to electrical energy, but the mechanical energy is provided by an outside source such as, by non-limiting example, a push on the pendulum 12, 110 by a user. The electric generator 10, 80, in implementations, therefore converts the mechanical energy imparted by a push of the pendulum 12, 110 into electric energy.

In places where the description above refers to particular implementations of an electric generator and implementing components, sub-components, methods and sub-methods, it should be readily apparent that a number of modifications may be made without departing from the spirit thereof and that these implementations, implementing components, sub-components, methods and sub-methods may be applied to other electric generators.

What is claimed is:

1. An electric generator, comprising:
a pendulum extending downwardly from an axle, the axle attached to a base unit, the pendulum configured to swing in response to a push from a user, the pendulum comprising a magnet comprising a north pole and a south pole;
a stationary electromagnetic coil with turns wound around, but not touching, the magnet, wherein the magnet has a freedom of motion relative to and within the stationary electromagnetic coil along a path of the magnet;
a stationary magnet mounted to the base unit and aligned with the path of the magnet, the stationary magnet comprising an electromagnet configured to be activated to one of repel and attract the magnet when the magnet is near the stationary magnet;
an electric switch positioned near the path of the magnet and configured to detect when the magnet has reached a predetermined point along the path;
a time delay module configured to receive an input from the electric switch, wherein a time of the time delay module's receipt of the input defines an input time, and wherein the time delay module is configured to generate an output at a time delayed from the input time by a predetermined amount of time; and
a battery electrically coupled to the time delay module and to the electromagnet, the battery configured to activate the electromagnet in response to the time delay module generating the output;
wherein the electric generator is configured to activate the electromagnet in response to the time delay module generating the output.

2. The electric generator of claim 1, further comprising a battery switch electrically coupled to the time delay module and to the battery and wherein the battery switch is configured to cause the battery to activate the electromagnet in response to the battery switch receiving the output from the time delay module.

3. The electric generator of claim 1, wherein the electromagnet is positioned such that, when activated, the electromagnet and the magnet have like poles facing one another so as to repel one another.

4. The electric generator of claim 1, further comprising a first rectifier and a second rectifier each electrically coupled to the electromagnetic coil by both a first wire and a second wire, the first rectifier and the second rectifier configured to convert alternating current induced in the electromagnetic coil into direct current, and a third wire and fourth wire each electrically coupled to the first rectifier and second rectifier and configured to transmit the direct current to the battery.

5. The electric generator of claim 1, wherein the axle comprises a plurality of concentric magnetic rings with like poles facing one another.

* * * * *